(12) United States Patent
Felch

(10) Patent No.: US 9,315,401 B2
(45) Date of Patent: Apr. 19, 2016

(54) WET AIR OXIDATION PROCESS USING RECYCLED COPPER CATALYST

(71) Applicant: Siemens Energy, Inc., Orlando, FL (US)

(72) Inventor: Chad L. Felch, Mosinee, WI (US)

(73) Assignee: SIEMENS ENERGY, INC., Orlando, FL (US)

( * ) Notice: Subject to any disclaimer, the term of this patent is extended or adjusted under 35 U.S.C. 154(b) by 263 days.

(21) Appl. No.: 13/865,664

(22) Filed: Apr. 18, 2013

(65) Prior Publication Data

US 2013/0228528 A1 Sep. 5, 2013

Related U.S. Application Data

(63) Continuation-in-part of application No. 12/523,962, filed as application No. PCT/US2008/000784 on Jan. 22, 2008, now Pat. No. 8,501,011.

(60) Provisional application No. 60/885,966, filed on Jan. 22, 2007.

(51) Int. Cl.
*C02F 1/66* (2006.01)
*C02F 1/72* (2006.01)
*C02F 1/00* (2006.01)
*C02F 11/08* (2006.01)

(52) U.S. Cl.
CPC ............... *C02F 1/725* (2013.01); *C02F 1/008* (2013.01); *C02F 1/66* (2013.01); *C02F 11/08* (2013.01); *C02F 2209/06* (2013.01)

(58) Field of Classification Search
CPC ...... C02F 1/725; C02F 11/08; C02F 2209/06; C02F 1/008; C02F 1/66
See application file for complete search history.

(56) References Cited

U.S. PATENT DOCUMENTS

| | | | |
|---|---|---|---|
| 3,607,004 | A | 9/1971 | Deschamps et al. |
| 3,607,925 | A | 9/1971 | Boichard et al. |
| 3,716,620 | A | 2/1973 | Deschamps et al. |
| 3,912,626 | A | 10/1975 | Ely et al. |
| 4,066,739 | A | 1/1978 | Chen |
| 4,094,780 | A | 6/1978 | Iwai et al. |
| 4,094,962 | A | 6/1978 | Cocuzza et al. |
| 4,141,828 | A | 2/1979 | Okada et al. |
| 4,214,982 | A | 7/1980 | Pfalzer |
| 4,220,505 | A | 9/1980 | Deem |

(Continued)

FOREIGN PATENT DOCUMENTS

| | | |
|---|---|---|
| CN | 1306943 A | 8/2001 |
| EP | 0368834 A1 | 5/1990 |

(Continued)

OTHER PUBLICATIONS

U.S. Appl. No. 12/523,962, filed Jul. 21, 2009.

(Continued)

*Primary Examiner* — Lucas Stelling

(57) ABSTRACT

A system and method for the treatment of process streams. A catalyst mediates a wet oxidation process at elevated temperatures and pressures for treating at least one undesirable constituent in an aqueous mixture. The aqueous mixture may be contacted with a catalyst and an oxidizing agent at an elevated temperature and a superatmospheric pressure. At least a portion of the catalyst may be precipitated by a pH adjustment and recycled back to contact the aqueous mixture

9 Claims, 6 Drawing Sheets

(56) References Cited

U.S. PATENT DOCUMENTS

| | | | |
|---|---|---|---|
| 4,234,423 A | 11/1980 | Moore et al. | |
| 4,265,747 A | 5/1981 | Copa et al. | |
| 4,294,706 A | 10/1981 | Kakihara et al. | |
| 4,294,720 A | 10/1981 | Visser et al. | |
| 4,347,226 A | 8/1982 | Audeh et al. | |
| 4,350,599 A | 9/1982 | Chowdhury | |
| 4,537,835 A | 8/1985 | Rohrmann et al. | |
| 4,626,354 A | 12/1986 | Hoffman et al. | |
| 4,749,492 A | 6/1988 | Berrigan, Jr. et al. | |
| 4,778,598 A | 10/1988 | Hoffman et al. | |
| 4,810,386 A | 3/1989 | Copa et al. | |
| 4,897,196 A | 1/1990 | Copa et al. | |
| 4,970,005 A | 11/1990 | Schuchardt | |
| 5,019,227 A | 5/1991 | White et al. | |
| 5,080,792 A | 1/1992 | McGovern et al. | |
| 5,082,571 A | 1/1992 | Beula et al. | |
| 5,145,587 A | 9/1992 | Ishii et al. | |
| 5,230,810 A | 7/1993 | Clark et al. | |
| 5,240,619 A | 8/1993 | Copa et al. | |
| 5,244,576 A | 9/1993 | DeRoeck et al. | |
| 5,246,597 A | 9/1993 | Jenson et al. | |
| 5,268,104 A | 12/1993 | Masoomain | |
| 5,298,174 A | 3/1994 | Momont et al. | |
| 5,358,646 A | 10/1994 | Gloyna et al. | |
| 5,368,726 A | 11/1994 | Masoomian | |
| 5,407,584 A | 4/1995 | Broussard, Sr. | |
| 5,543,057 A | 8/1996 | Whiting et al. | |
| 5,620,606 A | 4/1997 | McBrayer, Jr. et al. | |
| 5,641,413 A | 6/1997 | Momont et al. | |
| 5,707,530 A | 1/1998 | Broussard, Jr. | |
| 5,720,889 A | 2/1998 | McBrayer, Jr. et al. | |
| 5,885,422 A | 3/1999 | Kurukchi et al. | |
| 5,891,346 A | 4/1999 | Huntley | |
| 5,948,275 A | 9/1999 | Djafer et al. | |
| 6,110,385 A | 8/2000 | Copa et al. | |
| 6,210,583 B1 | 4/2001 | Kurukchi et al. | |
| 6,375,907 B1 | 4/2002 | Gallup | |
| 6,395,188 B1 | 5/2002 | Burdeniuc et al. | |
| 6,398,959 B1 | 6/2002 | Teran et al. | |
| 6,417,133 B1 | 7/2002 | Ebner et al. | |
| 6,444,130 B1 | 9/2002 | Manganaro et al. | |
| 6,576,144 B1 | 6/2003 | Vineyard | |
| 7,005,076 B2 | 2/2006 | Chowdhury et al. | |
| 7,172,701 B2 | 2/2007 | Gaid et al. | |
| 7,993,588 B2 * | 8/2011 | Felch | C02F 1/725 210/167.3 |
| 8,501,149 B2 | 8/2013 | Felch et al. | |
| 2004/0245188 A1 | 12/2004 | Chowdhury et al. | |
| 2005/0171390 A1 | 8/2005 | Felch et al. | |
| 2006/0060541 A1 | 3/2006 | Abazajian | |
| 2008/0078724 A1 | 4/2008 | Felch et al. | |
| 2008/0078725 A1 | 4/2008 | Felch et al. | |
| 2010/0126937 A1 | 5/2010 | Felch | |
| 2011/0210079 A1 | 9/2011 | Felch et al. | |

FOREIGN PATENT DOCUMENTS

| | | |
|---|---|---|
| EP | 1457268 A2 | 9/2004 |
| EP | 1647529 A1 | 4/2006 |
| FR | 2064785 A6 | 7/1971 |
| GB | 2423490 A | 8/2006 |
| JP | 61257291 A | 11/1986 |
| WO | 03045525 A1 | 6/2003 |
| WO | 2006010218 A1 | 2/2006 |
| WO | 2007069238 A1 | 6/2007 |

OTHER PUBLICATIONS

Cerium (Ce) Atomic Mass [Chemical Elements.com; accessed Aug. 2013; 2 pages].

Cerium and Cerium Oxide—MSDS etc. (8 pages).

De Leitenburg et al., "Wet oxidation of acetic acid catalyzed by doped ceria," Applied Catalysis B; Environmental, XP022214784, Dec. 27, 1996, pp. L29-L35, vol. 11, No. 1, Elsevier, Amsterdam, NL.

International Preliminary Report on Patentability dated Apr. 8, 2009 for PCT Application No. PCT/US2007/019907.

International Search Report and Written Opinion of the International Searching Authority dated May 19, 2008 in corresponding PCT Application No. PCT/US2007/019869.

International Search Report dated May 13, 2008 in corresponding PCT Application No. PCT/US2007/019907.

Manganese (Mn) Atomic Mass—[Chemical Elements.com; accessed Aug. 2013; 2 pages].

Mehra, A., et al., "Adsorption of Hydrogen Sulfide in Aqueous Solutions of Iodides Containing Dissolved Iodine: Enhancements in Rates Due to Precipitated Sulfer," Chemical Engineering Science, vol. 43, No. 5, pp. 1071-1081, 1988, pp. 1071-1081.

Platinum MSDS (5 pages).

Transition Metals List and Manganese Dioxide MSDS (7 pages).

Written Opinion of the International Searching Authority dated Apr. 3, 2009 for PCT Application No. PCT/US2007/019907.

Wubs, "Absorption of hydrogen sulfide in aqueous solutions of iodine—a critical review," Chemical Engineering Science, vol. 46, No. 2, 1991, pp. 703-706.

Yang et al., "Catalytic wet air oxidation of phenol over $CeO_2$-$TiO_2$ catalyst in the batch reactor and the packed-bed reactor," Journal of Hazardous Materials, XP022587244, Sep. 29, 2007, pp. 1248-1253, vol. 153, No. 3, Elsevier, Amsterdam, NL.

Zuh et al., "Application of catalytic wet air oxidation for the treatment of H-acid manufacturing process wastewater," Water Research, Elsevier, Amsterdam, vol. 36, No. 8, pp. 1947-1954; ISSN: 0043-1354; DOI: 10. 1016/ S0043-1354(01)00419-5; XP004352501, 2002.

* cited by examiner

WET AIR OXIDATION PROCESS USING RECYCLED COPPER CATALYST

RELATED APPLICATIONS

This application claims the benefit under 35 U.S.C. §120 of U.S. application Ser. No. 12/523,962, titled "WET AIR OXIDATION PROCESS USING RECYCLED CATALYST," filed on Jul. 21, 2009 as a national stage entry under 35 U.S.C. §371 of PCT application PCT/US2008/000784, titled "WET AIR OXIDATION PROCESS USING RECYCLED CATALYST," filed Jan. 22, 2008, which claims priority under 35 U.S.C. §119(e) to U.S. Provisional Application Ser. No. 60/885,966 titled "WET AIR OXIDATION PROCESS USING RECYCLED COPPER CATALYST," filed on Jan. 22, 2007, each of which are herein incorporated by reference in their entireties.

BACKGROUND

1. Field of Disclosure

The present disclosure relates generally to the treatment of process streams and, more particularly, to catalytic wet oxidation systems and methods for treatment of undesirable constituents therein.

2. Discussion of Related Art

Wet oxidation is a well-known technology for treating process streams, and is widely used, for example, to destroy pollutants in wastewater. The method involves aqueous phase oxidation of undesirable constituents by an oxidizing agent, generally molecular oxygen from an oxygen-containing gas, at elevated temperatures and pressures. The process can convert organic contaminants to carbon dioxide, water and biodegradable short chain organic acids, such as acetic acid. Inorganic constituents including sulfides, mercaptides and cyanides can also be oxidized. As an alternative to incineration, wet oxidation may be used in a wide variety of applications to treat process streams for subsequent discharge, in-process recycle, or as a pretreatment step to supply a conventional biological treatment plant for polishing. Catalytic wet oxidation has emerged as an effective enhancement to traditional non-catalytic wet oxidation. Catalytic wet oxidation processes generally allow for greater destruction to be achieved at a lower temperature and pressure, and therefore a lower capital cost. An aqueous stream to be treated is mixed with an oxidizing agent and contacted with a catalyst at elevated temperatures and pressures. Heterogeneous catalysts typically reside on a bed over which the aqueous mixture is passed, or in the form of solid particulate which is blended with the aqueous mixture prior to oxidation. The catalyst may be filtered out of the oxidation effluent downstream of the wet oxidation unit for reuse.

SUMMARY

In accordance with one or more aspects or embodiments, the present disclosure relates to processes and systems for catalytic wet oxidation. According to one aspect, a catalytic wet oxidation process comprises providing an aqueous mixture containing at least one undesirable constituent to be treated. The aqueous mixture is contacted with a catalyst and an oxidizing agent at an elevated temperature and a superatmospheric pressure to treat the at least one undesirable constituent and form an oxidized aqueous mixture. At least a portion of the catalyst is precipitated by adjusting a pH level of the oxidized aqueous mixture to form a precipitated catalyst. At least a portion of the precipitated catalyst is recycled to contact the aqueous mixture.

According to another aspect, a catalytic wet oxidation system comprises a wet oxidation unit, a source of an aqueous mixture comprising at least one undesirable constituent fluidly connected to the wet oxidation unit, a source of a catalyst soluble in the aqueous mixture fluidly connected to the wet oxidation unit, positioned between the source of the aqueous mixture and the wet oxidation unit, a pH sensor configured to detect a pH level of an oxidized aqueous mixture downstream of the wet oxidation unit, a pH controller in communication with the pH sensor, configured to generate a control signal to adjust the pH level of the oxidized aqueous mixture to a level outside a predetermined pH solubility range for the catalyst in response to the pH sensor registering a pH level within a predetermined pH solubility range for the catalyst, a separator configured to precipitate at least a portion the catalyst positioned downstream of and in fluid communication with the wet oxidation unit and downstream of the pH controller, and a recirculation line fluidly connected to an outlet of the separator and to an inlet of at least one of the source of catalyst and an inlet to the wet oxidation system.

According to another aspect, a method of facilitating recycling a catalyst used in a catalytic wet oxidation process comprises providing a pH monitoring system having a controller in communication with a pH sensor, the controller configured to generate a control signal to adjust a pH level of an aqueous mixture in response to the pH sensor registering a pH level within a predetermined pH solubility range for a utilized catalyst.

According to another aspect, a catalytic wet oxidation process comprises contacting an aqueous mixture containing at least one undesirable constituent to be treated with a catalyst and an oxidizing agent at an elevated temperature and a superatmospheric pressure at a pH within a first range at which the catalyst is substantially soluble to treat the at least one undesirable constituent within a wet oxidation reactor and form an oxidized aqueous mixture within the wet oxidation reactor. The process further comprises precipitating at least a portion of the catalyst solely by adjusting a pH level of the oxidized aqueous mixture to a pH within a second range to form a precipitated catalyst and recycling at least a portion of the precipitated catalyst to contact the aqueous mixture.

In some embodiments the first range of pH and the second range of pH are non-overlapping.

In some embodiments contacting the aqueous mixture with the catalyst occurs prior to bringing the aqueous mixture to the elevated temperature.

In some embodiments contacting the aqueous mixture with the catalyst occurs prior bringing the aqueous mixture to the superatmospheric pressure.

In some embodiments the process further comprises monitoring the pH level of the aqueous mixture.

In some embodiments the aqueous mixture is oxidized in a continuous process.

In some embodiments the process further comprises replenishing the catalyst.

In some embodiments contacting the aqueous mixture with the oxidizing agent comprises contacting the aqueous mixture with an oxygen-containing gas.

In some embodiments precipitating at least a portion of the catalyst comprises increasing the pH of at least a portion of the oxidized aqueous mixture.

In some embodiments precipitating at least a portion of the catalyst comprises decreasing the pH of at least a portion of the oxidized aqueous mixture.

In some embodiments the catalyst comprises copper and the first range of pH is selected from the group consisting of below 6 and above about 12.

In some embodiments the precipitated catalyst comprises copper oxide.

In some embodiments adjusting the pH level of the oxidized aqueous mixture comprises adjusting the pH level of the oxidized aqueous mixture to range of pH of from about 6 to about 12.

In some embodiments adjusting the pH level of the oxidized aqueous mixture comprises adjusting the pH level of the oxidized aqueous mixture to range of pH of from about 8 to about 9.

In some embodiments the process further comprises adjusting the pH of at least a portion of the precipitated catalyst.

In some embodiments adjusting the pH of at least a portion of the precipitated catalyst comprises adjusting the pH to a level at which at least a portion of the precipitated catalyst solubilizes.

In some embodiments the process further comprises clarifying the oxidized aqueous mixture, thereby forming a first separated solution, prior to precipitating at least a portion of the catalyst from the oxidized aqueous mixture.

In some embodiments the process further comprises contacting the first separated solution with the aqueous mixture containing at least one undesirable constituent to be treated.

In some embodiments the process further comprises recovering substantially all of the catalyst.

In some embodiments the aqueous mixture is oxidized for a period of time sufficient to treat the at least one undesirable constituent.

In some embodiments the superatmospheric pressure is from about 30 atmospheres to about 275 atmospheres.

In some embodiments the elevated temperature is from about 240° C. to about the critical temperature of water.

In some embodiments the elevated temperature is above the critical temperature of water.

In some embodiments precipitating the at least a portion of the catalyst is accomplished with a two step catalyst settling process. The two step catalyst settling process comprises performing a rough clarification in a first clarifier to produce a first supernatant and a first separated solution including soluble catalyst, contacting at least a portion of the first separated solution with the aqueous mixture, settling at least a portion of the first supernatant in a second clarifier to produce solidified catalyst and an oxidized effluent essentially free of catalyst, contacting the solidified catalyst from the second clarifier with the aqueous mixture, and withdrawing the oxidized effluent essentially free of catalyst from the second clarifier.

In some embodiments the process further comprises adjusting a pH of the at least a portion of the first supernatant prior to settling the at least a portion of the first supernatant in the second clarifier.

In some embodiments the process further comprises adjusting a pH of the solidified catalyst from the second clarifier prior to contact with the aqueous solution.

In some embodiments the catalyst comprises vanadium and the first range of pH is above about 4.5.

In some embodiments the catalyst comprises iron and the first range of pH is below about 4.

In some embodiments the catalyst comprises copper and the first range of pH is selected from the group consisting of below about 4 and above about 12.

In some embodiments the first range of pH is selected from the group consisting of below about 2 and above about 13.

According to another aspect, a catalytic wet oxidation system comprises a wet oxidation unit, a source of an aqueous mixture comprising at least one undesirable constituent fluidly connected to the wet oxidation unit, a source of a catalyst soluble in the aqueous mixture fluidly connected to the wet oxidation unit and positioned between the source of the aqueous mixture and the wet oxidation unit, the aqueous mixture having a pH within a first range at which the catalyst is substantially soluble, a sensor configured to detect a pH level of an oxidized aqueous mixture formed in the wet oxidation unit, a pH controller in communication with the pH sensor and configured to generate a control signal to adjust the pH level of the oxidized aqueous mixture to a pH within a second range at which the catalyst is substantially insoluble in response to the pH sensor registering a pH level within the first range, a separator in direct fluid communication downstream of the wet oxidation unit and downstream of the pH controller and configured to precipitate, solely by the adjustment of the pH level of the oxidized aqueous mixture, at least a portion the catalyst, and a recirculation line fluidly connected to an outlet of the separator and to an inlet of at least one of the source of catalyst and an inlet to the wet oxidation system.

In some embodiments the system further comprises a secondary treatment unit connected downstream of the wet oxidation unit.

In some embodiments the system further comprises a source of an alkali compound positioned downstream of and fluidly connected to at least one of the separator and the wet oxidation unit.

In some embodiments the system further comprises a source of an acid positioned downstream of and fluidly connected to at least one of the separator and the wet oxidation unit.

In some embodiments the catalyst comprises copper and the first range of pH is selected from the group consisting of below 6 and above about 12.

In some embodiments the system further comprises a second pH sensor in communication with the pH controller configured to detect a pH level of an oxidized aqueous mixture in the separator, the pH controller further configured to generate a control signal to adjust a pH level of the oxidized aqueous mixture in the separator to within a range from about 6 to about 12.

In some embodiments the pH controller is further configured to generate a control signal to adjust a pH level of the oxidized aqueous mixture in the separator to a range from about 8 to about 9.

In some embodiments the pH controller further configured to generate a control signal to adjust a pH level of the oxidized aqueous mixture in the separator to about 9.

In some embodiments the system further comprises a clarifier upstream of and fluidly connected to the separator configured to clarify the oxidized aqueous mixture, thereby forming a reject.

In some embodiments the system further comprises a conduit configured to transport at least a portion of the reject to a location in the system upstream of and in fluid communication with the wet oxidation unit and to contact the reject with the aqueous mixture comprising at least one undesirable constituent.

In some embodiments substantially all of the catalyst is recovered.

In some embodiments the system further comprises a source of a pH adjuster fluidly connected with the recirculation line.

In some embodiments the system further comprises a third pH sensor in communication with the pH controller, configured to detect a pH level of an aqueous mixture in the recirculation line, the pH controller further configured to generate a control signal to adjust a pH level of the aqueous mixture in the recirculation line in response to the third pH sensor registering a pH level outside a predetermined pH solubility range for the catalyst.

According to a further aspect, a method of facilitating recycling a catalyst used in a catalytic wet oxidation process comprises providing a pH monitoring system having a controller in communication with a pH sensor, the controller configured to generate a control signal to adjust a pH level of an oxidized aqueous mixture formed in the catalytic wet oxidation process in response to the pH sensor registering a pH level within a predetermined pH solubility range for the catalyst, and to precipitate the catalyst solely by the adjustment of the pH of the oxidized aqueous mixture.

The advantages, novel features, and objects of the disclosed aspects and embodiments will become apparent from the following detailed description with the accompanying drawings.

BRIEF DESCRIPTION OF DRAWINGS

The accompanying drawings are not intended to be drawn to scale. In the drawings, each identical or nearly identical component that is illustrated in various figures is represented by like numeral. For purposes of clarity, not every component may be labeled in every drawing. Non-limiting embodiments will be described with reference to the accompanying drawings, in which.

DETAILED DESCRIPTION

Figure 1:
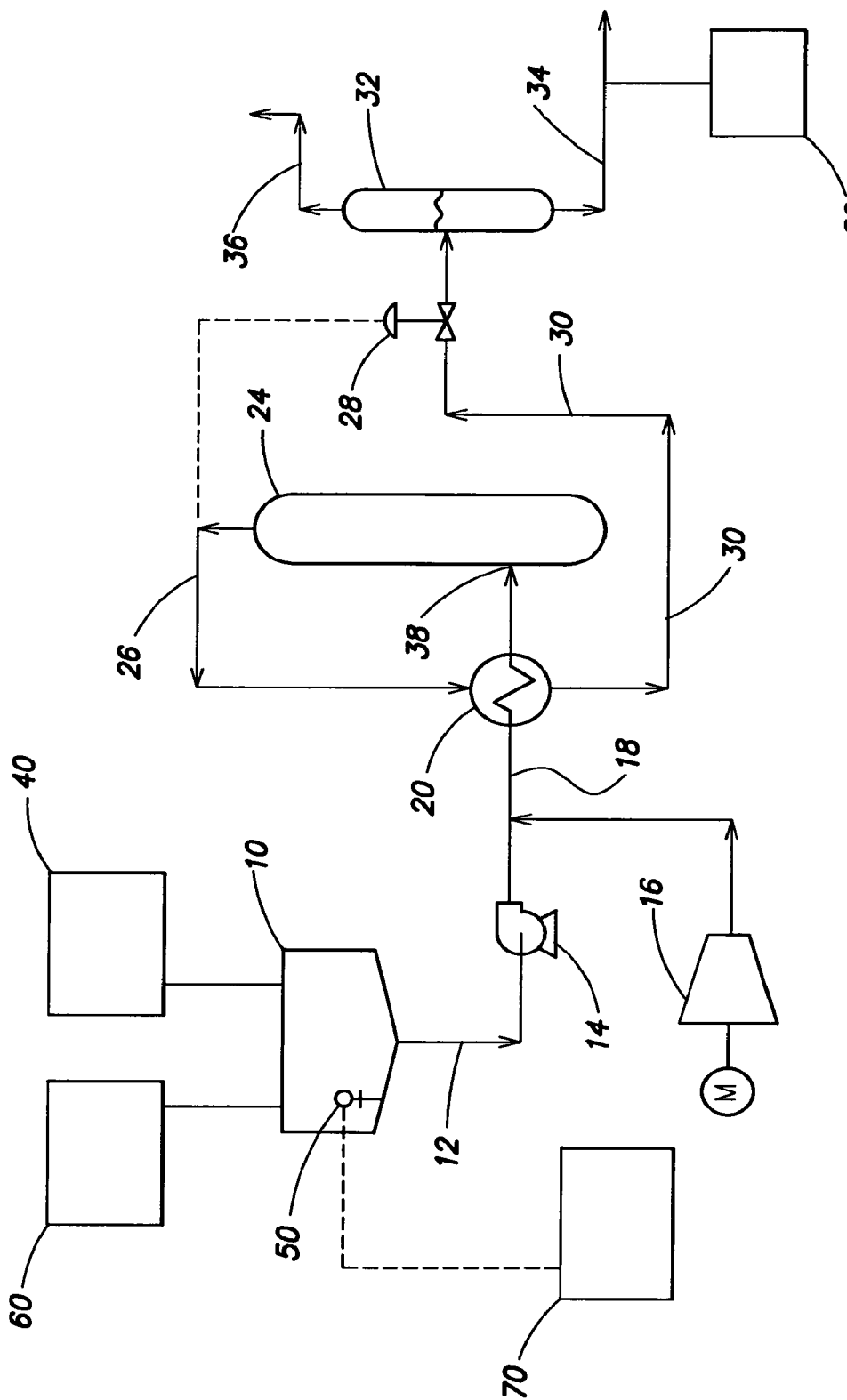
FIG. 1 is a system diagram in accordance with one embodiment of a wet oxidation system.

Aspects and embodiments disclosed herein are not limited in their application to the details of construction and the arrangement of components set forth in the following description or illustrated in the drawings. Aspects and embodiments disclosed herein are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

In accordance with one or more embodiments, the present disclosure relates to one or more systems and methods for treating process streams. In typical operation, the disclosed systems may receive process streams from community, industrial or residential sources. For example, in embodiments in which the system is treating wastewater, the process stream may be delivered from a municipal wastewater sludge or other large-scale sewage system. Process streams may also originate, for example, from food processing plants, chemical processing facilities, gasification projects, or pulp and paper plants. The process stream may be moved through the system by an operation upstream or downstream of the system.

As used herein, the term "process stream" refers to an aqueous mixture deliverable to the system for treatment. After treatment, the process stream may be returned to an upstream process or may exit the system as waste. The aqueous mixture typically includes at least one undesirable constituent capable of being oxidized. The undesirable constituent may be any material or compound targeted to be removed from the aqueous mixture, such as for public health, process design and/or aesthetic considerations. In some embodiments, the undesirable constituents capable of being oxidized are organic compounds. Certain inorganic constituents, for example, sulfides, mercaptides and cyanides can also be oxidized. A source of an aqueous mixture to be treated by the system, such as a slurry, may take the form of direct piping from a plant or holding vessel.

In accordance with one or more embodiments of the present disclosure, it is desirable to disrupt one or more specific chemical bonds in the undesirable constituent or degradation product(s) thereof. An oxidation reaction is one destruction technique, capable of converting oxidizable organic contaminants to carbon dioxide, water and biodegradable short chain organic acids, such as acetic acid. One aspect of the present disclosure involves systems and methods for oxidative treatment of aqueous mixtures containing one or more undesirable constituents.

In one embodiment, an aqueous mixture including at least one undesirable constituent is wet oxidized. The aqueous mixture is oxidized with an oxidizing agent at an elevated temperature and superatmospheric pressure for a duration sufficient to treat the at least one undesirable constituent. The oxidation reaction may substantially destroy the integrity of one or more chemical bonds in the undesirable constituent. As used herein, the phrase "substantially destroy" is defined as at least about 95% destruction. The process of the present disclosure is generally applicable to the treatment of any undesirable constituent capable of being oxidized.

The disclosed wet oxidation processes may be performed in any known batch or continuous wet oxidation unit suitable for the compounds to be oxidized. Typically, aqueous phase oxidation is performed in a continuous flow wet oxidation system, as exemplarily shown in FIG. 1. Any oxidizing agent may be used. The oxidant is usually an oxygen-containing gas, such as air, oxygen-enriched air, or essentially pure oxygen. As used herein, the phrase "oxygen-enriched air" is defined as air having an oxygen content greater than about 21%.

In typical operation, and with reference to FIG. 1, an aqueous mixture from a source, shown as storage tank 10, flows through a conduit 12 to a high pressure pump 14 which pressurizes the aqueous mixture. The aqueous mixture is mixed with a pressurized oxygen-containing gas, supplied by a compressor 16, within a conduit 18. The aqueous mixture flows through a heat exchanger 20 where it is heated to a temperature which initiates oxidation. The heated feed mixture then enters a reactor vessel 24 at inlet 38. The wet oxidation reactions are generally exothermic and the heat of reaction generated in the reactor may further raise the temperature of the mixture to a desired value. The bulk of the oxidation reaction occurs within reactor vessel 24 which provides a residence time sufficient to achieve the desired degree of oxidation. The oxidized aqueous mixture and oxygen depleted gas mixture then exit the reactor through a conduit 26 controlled by a pressure control valve 28. As used herein the terms "oxidized aqueous mixture" or "oxidized effluent" refer to the oxidized fluid exiting the reactor vessel 24 prior to any chemical treatment downstream of the reactor vessel 24. Liquid-gas separation is not considered a "chemical treatment" as the term is used herein. The hot oxidized effluent traverses the heat exchanger 20 where it is cooled against incoming raw aqueous mixture and gas mixture. The cooled effluent mixture flows through a conduit 30 to a separator vessel 32 where liquid and gases are separated. The liquid effluent exits the separator vessel 32 through a lower conduit 34 while off gases are vented through an upper conduit 36. Treatment of the off gas may be required in a downstream off gas treatment unit depending on its composition and the requirements for discharge to the atmosphere. The wet oxidized effluent may typically be discharged into a biological treatment plant for polishing. The effluent may also be recycled for further processing by the wet oxidation system.

Sufficient oxygen-containing gas is typically supplied to the system to maintain residual oxygen in the wet oxidation system off gas, and the superatmospheric gas pressure is typically sufficient to maintain water in the liquid phase at the selected oxidation temperature. For example, the minimum system pressure at 240° C. is 33 atmospheres, the minimum pressure at 280° C. is 64 atmospheres, and the minimum pressure at 373° C. is 215 atmospheres. In one embodiment, the aqueous mixture is oxidized at a pressure of about 30 atmospheres to about 275 atmospheres. The wet oxidation process may be operated at an elevated temperature below 374° C., the critical temperature of water. In one embodiment, the wet oxidation process may be operated at an elevated temperature ranging from about 150° C. and a pressure of about 6 atmospheres to an elevated temperature of about 320° C. and a pressure of about 200 atmospheres. In some embodiments, the wet oxidation process may be operated at a supercritical elevated temperature. The retention time for the aqueous mixture within the reaction chamber should be generally sufficient to achieve the desired degree of oxidation. In some embodiments, the retention time is above about one hour and up to about eight hours. In at least one embodiment, the retention time is at least about 15 minutes and up to about 6 hours. In one embodiment, the aqueous mixture is oxidized for about 15 minutes to about 4 hours. In another embodiment, the aqueous mixture is oxidized for about 30 minutes to about 3 hours.

According to one or more embodiments, the wet oxidation process is a catalytic wet oxidation process. The oxidation reaction may be mediated by a catalyst. The aqueous mixture containing at least one undesirable constituent to be treated is generally contacted with a catalyst and an oxidizing agent at an elevated temperature and superatmospheric pressure. An effective amount of catalyst may be generally sufficient to increase reaction rates and/or improve the overall destruction removal efficiency of the system, including enhanced reduction of chemical oxygen demand (COD) and/or total organic carbon (TOC). The catalyst may also serve to lower the overall energy requirements of the wet oxidation system.

In at least one embodiment, the catalyst may be any transition metal of groups V, VI, VII and VIII of the Periodic Table. In one embodiment, for example, the catalyst may be V, Cr, Mn, Fe, Co, Ni, Cu, Zn, Mo, Ag, or alloys or mixtures thereof. The transition metal may be elemental or present in a compound, such as a metal salt. In one embodiment, the transition metal catalyst is vanadium. In another embodiment, the transition metal catalyst is iron. In yet another embodiment, the transition metal catalyst is copper.

A catalyst may be added to the aqueous mixture at any point in the wet oxidation system. The catalyst may be mixed with the aqueous mixture. In one embodiment, the catalyst may be added to the source of the aqueous mixture feeding the wet oxidation unit as illustrated in FIG. 1 in which catalyst source 40 is fluidly connected to storage tank 10. In some embodiments, the catalyst may be directly added to the wet oxidation unit. In other embodiments, the catalyst may also be supplied to the aqueous mixture prior to heating and/or pressurization.

In yet other embodiments, the catalyst may already be present in the process stream to be treated. The aqueous mixture supplied to the oxidation unit may contain a catalytic material. For example, transition metals may be present in a waste stream to be treated by the catalytic wet oxidation system. Aqueous slurries, such as those containing volatile organic carbons, may contain metals capable of acting as a catalyst. For example, the aqueous mixture may be a slurry of gasification byproducts.

According to one or more embodiments, the catalyst may be soluble in the aqueous mixture to enhance the wet oxidation process. In general, characteristics of the aqueous mixture may impact the solubility of a catalyst in the aqueous mixture. For example, a pH level of the aqueous mixture to be treated may affect the solubility of a particular catalyst in the aqueous mixture.

In some embodiments, a catalyst may be selected based on a characteristic of the aqueous mixture. As illustrated in FIG. 1, the wet oxidation system may include a sensor 50, configured to detect a characteristic of the aqueous mixture to be treated. In some embodiments, sensor 50 may be a pH sensor configured to detect a pH level of the aqueous mixture, and a catalyst for the wet oxidation process may be selected based on a detected pH level of the aqueous mixture.

The relationship between solubility and pH level for various catalysts is generally known by those skilled in the art. Potential-pH equilibrium diagrams have been constructed for various catalyst-water systems and are readily available to those skilled in the art familiar with how to reference them. For example, reproductions of what are commonly referred to as Pourbaix diagrams available from Pourbaix, M. M., The Atlas of Electrochemical Equilibria in Aqueous Solutions, National Association of Corrosion Engineers: Texas 1974, are presented in FIGS. 4-6 for copper, vanadium and iron, respectively.

Figure 5:
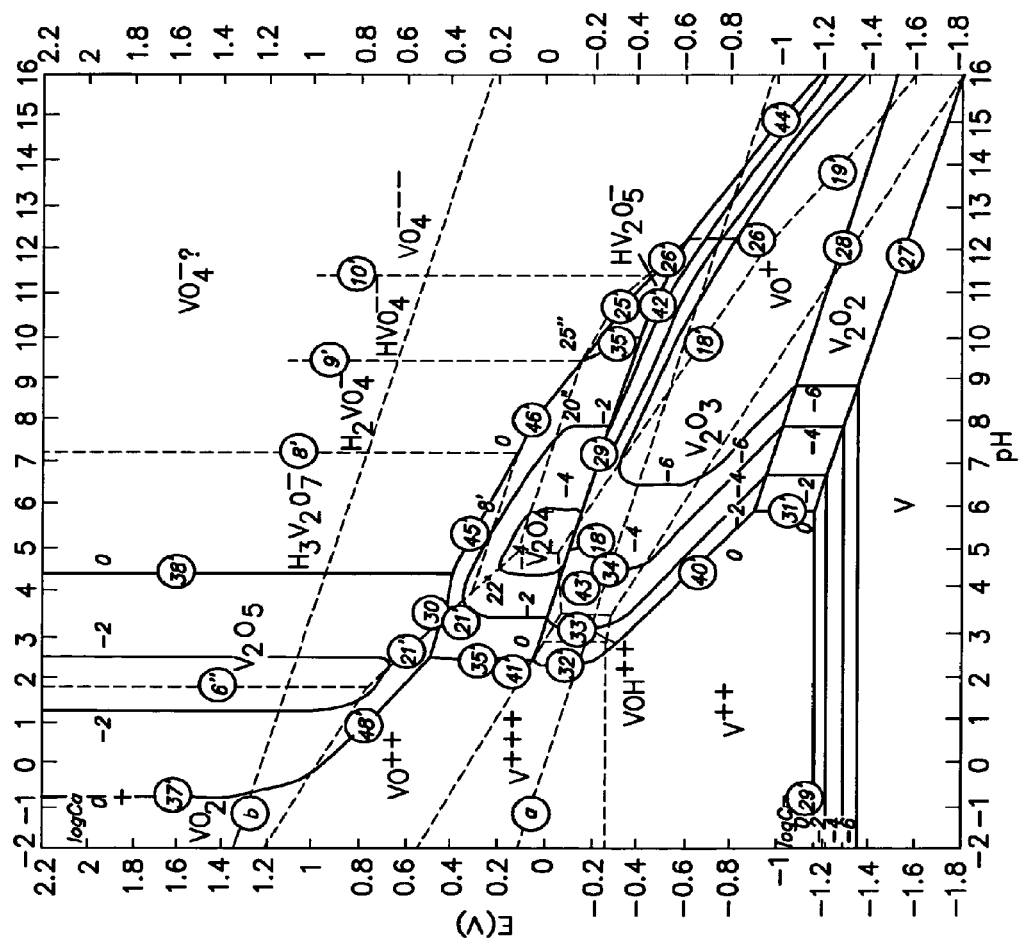
Figure 6:
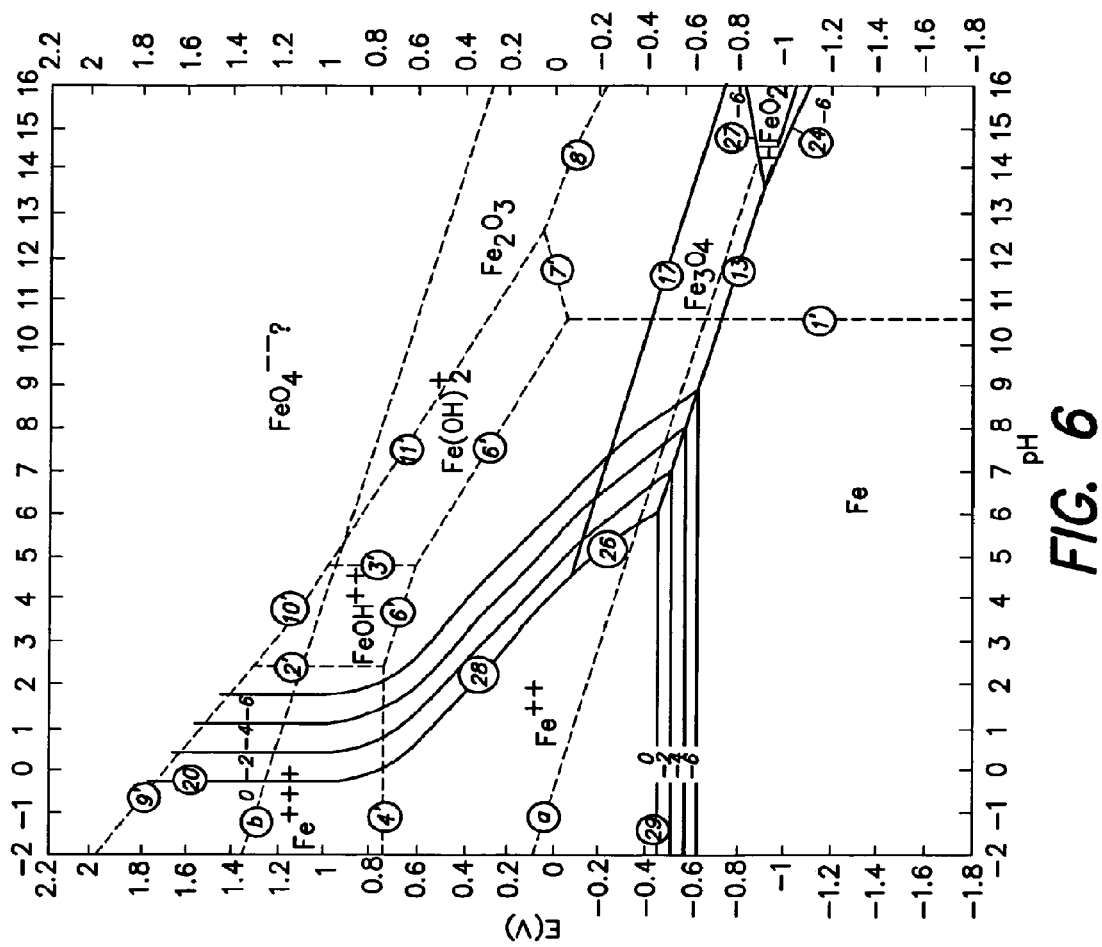

In accordance with one or more embodiments, a catalyst soluble at the detected pH level may be selected to enhance the wet oxidation process. Thus, with reference to FIG. 4, if the pH level of the aqueous mixture detected by pH sensor 50 is below about 2 (or in some embodiments below about 4 or below about 4.5) or above about 12 or above about 13, a catalyst comprising copper may be selected for catalyst source 40 in accordance with one or more embodiments. Likewise, with reference to FIG. 5, a catalyst comprising vanadium may be selected when the detected pH level is above about 4.5. With reference to FIG. 6, a catalyst comprising iron may be selected when the detected pH level is below about 4. Other catalysts beyond those exemplarily presented herein may be utilized.

In other embodiments, a catalyst may be selected and one or more characteristics of the aqueous mixture may be manipulated to promote the presence of the selected catalyst in a soluble form to enhance the wet oxidation process. For example, a pH level of the aqueous mixture may be detected by sensor 50 and adjusted to solubilize the selected catalyst in the aqueous mixture. The selected catalyst may be solubilized in the aqueous mixture solely by the adjustment of the pH of the aqueous mixture. The selected catalyst may be solubilized in the aqueous mixture without the addition of any complexing agent, for example, ammonia to facilitate the solubilization of the selected catalyst in the aqueous mixture. A pH adjuster may be added to the aqueous mixture at any point within the wet oxidation system but is preferably added such that the catalyst is soluble within the aqueous mixture during the oxidation reaction. In some embodiments, a source of pH adjuster 60 may be fluidly connected to the source of the aqueous mixture 10 as illustrated in FIG. 1. The source of pH adjuster 60 may generally include any material or compound capable of adjusting the pH level of the aqueous mixture to a desired value or range, such as an acid or base. For example, an alkali metal hydroxide may be utilized to adjust the pH level of the aqueous mixture. In one embodiment, ammonia may be used to solubilize the catalyst.

Figure 4:
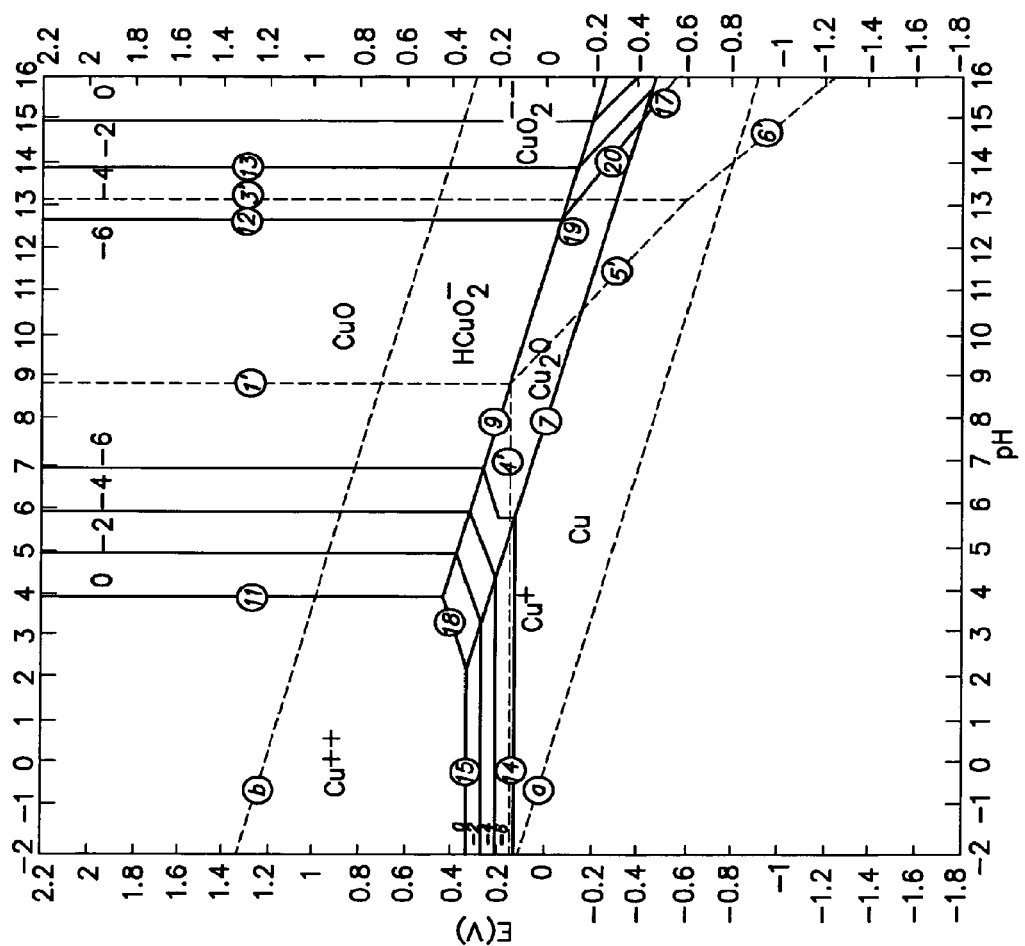
FIGS. 4-6 are Pourbaix diagrams referenced herein for copper, vanadium, and iron, respectively.

Again, the relationship between solubility and pH level for various catalysts is generally known by those skilled in the art. As discussed above, Pourbaix diagrams may provide information for determining a desired pH range in which a selected catalyst would be soluble. With reference to FIG. 4, the pH level of the aqueous mixture may be adjusted to below about 2 (or in some embodiments below about 4 or below about 4.5) or above about 12 or above about 13 when the selected catalyst comprises copper. Likewise, with reference to FIG. 5, the pH level of the aqueous mixture may be adjusted to above about 4.5 when the selected catalyst comprises vanadium. When a catalyst comprising iron is selected, the pH level of the aqueous mixture may be adjusted to a level below about 4 with reference to FIG. 6.

In some embodiments, the wet oxidation system may include a controller 70 for adjusting or regulating at least one operating parameter of the system or a component of the system, such as, but not limited to, actuating valves and pumps. Controller 70 may be in electronic communication with sensor 50 as illustrated in FIG. 1. Controller 70 may be generally configured to generate a control signal to adjust the pH level of the aqueous mixture in response to the pH sensor 50 registering a pH level outside a predetermined pH solubility range for the selected catalyst. For example, controller 70 may provide a control signal to one or more valves associated with pH adjuster source 60 to add pH adjuster to aqueous mixture source 10.

The controller 70 is typically a microprocessor-based device, such as a programmable logic controller (PLC) or a distributed control system, that receives or sends input and output signals to and from components of the wet oxidation system. Communication networks may permit any sensor or signal-generating device to be located at a significant distance from the controller 70 or an associated computer system, while still providing data therebetween. Such communication mechanisms may be effected by utilizing any suitable technique including but not limited to those utilizing wireless protocols.

As discussed above with respect to typical operation of the oxidation unit, a liquid effluent is separated from the oxidized aqueous mixture downstream of the oxidation reactor. In some embodiments, the catalyst may be recovered from the liquid effluent by a separation process. For example, in some embodiments the catalyst may be precipitated out of the effluent stream. In one embodiment, a crystallizer may be used to recover the catalyst. The catalyst may then be recycled back to the wet oxidation system.

Figure 2:
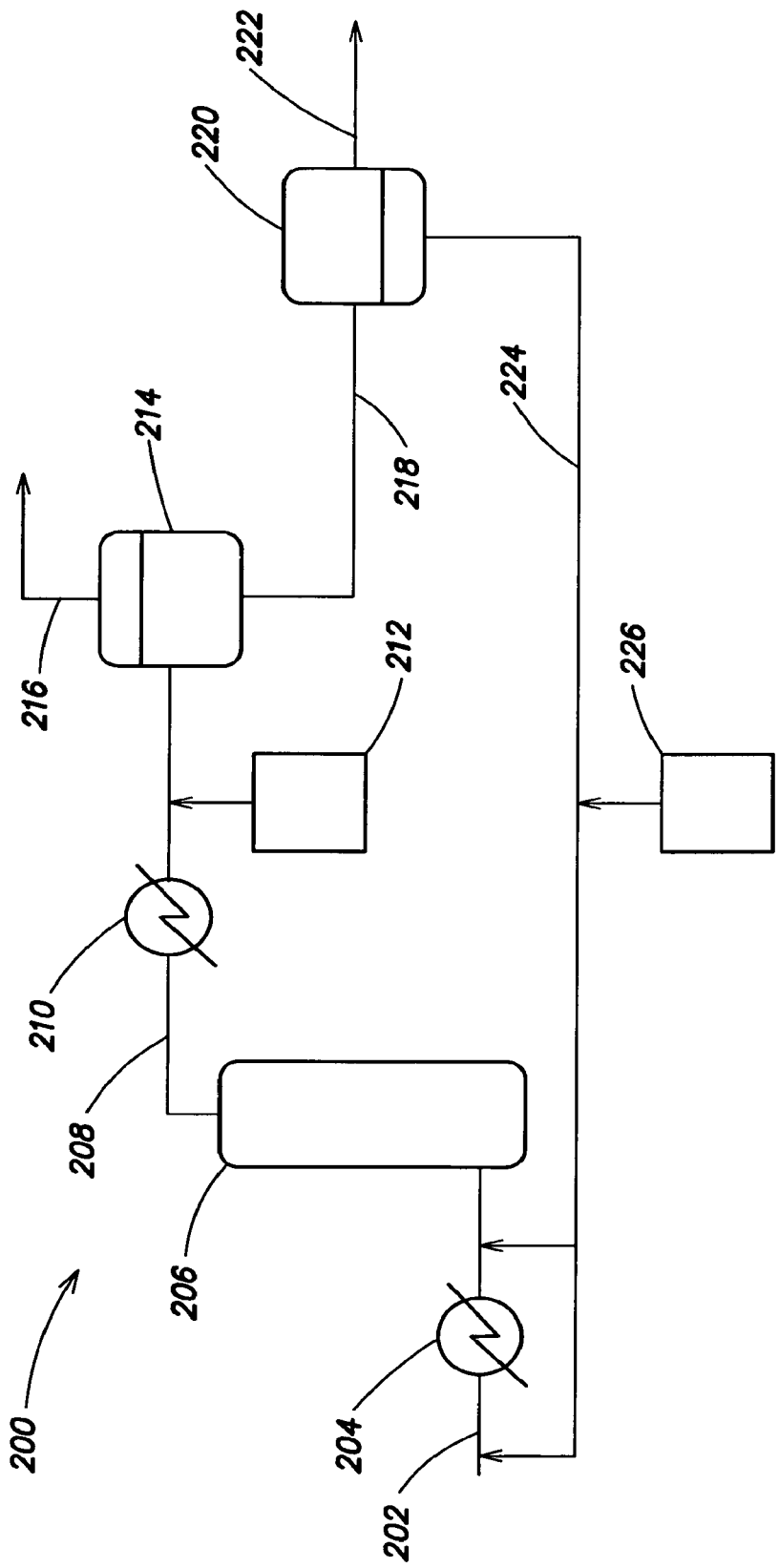
FIG. 2 is a system diagram in accordance with an embodiment of a wet oxidation system including a catalyst recycle process.

FIG. 2 illustrates another embodiment of a wet oxidation system including a catalyst recycling system. In this embodiment, a process stream may enter the system 200 through line 202. Catalysts that may be utilized in system 200 may include any transition metal of groups V, VI, VII and VIII of the Periodic Table. In some embodiments, for example, the catalyst may be V, Cr, Mn, Fe, Co, Ni, Cu, Zn, Mo, Ag, or alloys or mixtures thereof. The transition metal may be elemental or present in a compound, such as a metal salt. In one embodiment, the transition metal catalyst is vanadium. In another embodiment, the transition metal catalyst is iron. In yet another embodiment, the transition metal catalyst is copper.

According to one or more embodiments, the catalyst may be soluble in the aqueous mixture to enhance the wet oxidation process. In general, characteristics of the aqueous mixture may impact the solubility of a catalyst in the aqueous mixture. For example, a pH level of the aqueous mixture to be treated may affect the solubility of a particular catalyst in the aqueous mixture.

In accordance with one or more embodiments, a catalyst soluble at the pH level of the incoming aqueous mixture may be selected to enhance the wet oxidation process. A pH sensor, similar to pH sensor 50 of FIG. 1 may be incorporated into the input of the wet oxidation system 200 of FIG. 2 to provide an indication of the pH of the incoming aqueous mixture. Thus, with reference to FIG. 4, if the pH level of the aqueous mixture is below about 2 (or in some embodiments below about 4 or below about 4.5) or above about 12 or above about 13, a catalyst comprising copper may be selected in accordance with one or more embodiments. Likewise, with reference to FIG. 5, a catalyst comprising vanadium may be selected when the pH level of the aqueous mixture is above about 4.5. With reference to FIG. 6, a catalyst comprising iron may be selected when the pH level of the aqueous mixture is below about 4. Other catalysts beyond those exemplarily presented herein may be utilized.

With reference to FIG. 2, catalyst may be added to the process stream at the inlet of the system or as it flows through line 202 via line 224, which may carry an aqueous mixture comprising a recycled catalyst as will be discussed further below. Fresh catalyst may also be added along with the recycled catalyst.

In other embodiments, the catalyst or a portion of the catalyst may already be present in the process stream to be treated. The aqueous mixture supplied to the oxidation unit may contain a catalytic material. For example, transition metals may be present in a waste stream to be treated by the catalytic wet oxidation system. Aqueous slurries, such as those containing volatile organic carbons, may contain metals capable of acting as a catalyst. For example, the aqueous mixture may be a slurry of gasification byproducts.

The process stream may pass through heat exchanger 204 where it may be heated to the desired temperature for a given residence time before entering reactor 206. After treatment is completed, the treated process stream leaves reactor 206 through line 208. The treated process stream may then be cooled by heat exchanger 210, which in some embodiments may be the same heat exchanger as heat exchanger 204. The treated process stream may be pH adjusted by the addition of an acid or an alkali compound from source of pH adjuster 212. A pH sensor (not shown) may be provided in communication with the source of pH adjuster 212 in order to monitor the pH of the oxidized aqueous mixture as pH adjuster is added from the source of pH adjuster 212 and give a signal to interrupt pH adjustment when the pH reaches a predetermined point. In alternate embodiments, a pH sensor (not shown) may be located downstream of the source of pH adjuster 212 and coupled to a pH controller (not shown), such as controller 70 illustrated in FIG. 1, configured to control the flow of pH adjuster from the source of pH adjuster through delivery pumps and/or valves and/or piping associated with the source of pH adjuster 212 into the oxidized aqueous mixture in order to maintain a pH within a predetermined range. In some embodiments, the addition of pH adjuster from the source of pH adjuster 212 may be manually controlled. In some embodiments, the source of pH adjuster 212 may be configured to introduce pH adjuster into line 218 downstream of gas/liquid separator 214 instead of upstream of gas/liquid separator 214 as illustrated in FIG. 2. In other embodiments, the source of pH adjuster 212 may be configured to introduce pH adjuster directly into clarifier 220.

For example, if copper is used as a catalyst, a treated process stream containing soluble copper hydroxide may be cooled to approximately 80° C. and pH adjusted to a range from about 6 to about 12, either upstream or downstream of gas/liquid separator 214, or within clarifier 220, conditions under which the solubility of copper hydroxide is low (<1 ppm at 25° C.). In some embodiments the pH may be adjusted to a range of from about 8 to about 9 and in some embodiments the pH may be adjusted to about 9. After passing through gas/liquid separator 214, where off-gas is released through line 216, the treated process stream may travel through line 218 to clarifier 220 where in the presence of oxygen at 80° C. at a pH of from about 6 to about 12, at least a portion of the copper hydroxide is converted to copper oxide particulate. In some embodiments the copper hydroxide is converted to copper oxide particulate in the clarifier at a pH in a range of from about 8 to about 9 and in some embodiments the copper hydroxide is converted to copper oxide particulate in the clarifier at a pH of about 9. The copper oxide particulates may settle in clarifier 220 and at least a portion of the concentrated effluent slurry may be removed and recycled back to the inlet of the system 200 through line 224, while oxidized effluent essentially free of copper may be removed through line 222. The pH of the recycled copper containing effluent may be adjusted by the addition of an acid or alkali compound from source of pH adjuster 226 as is desired in response to a signal from a pH sensor in communication with line 224 (not shown) and/or a pH controller (not shown). pH adjuster may be added to the recycled copper containing effluent in order to adjust the pH to a level at which the copper catalyst is soluble. For example, since copper is generally soluble at pH levels of below about 6 or above about 12, if the recycled copper containing effluent has a pH of between about 6 and about 12, acid may be added to decrease the pH level to the recycled copper containing effluent to below about 6, or alternatively, a caustic compound may be added to increase the pH level of the recycled copper containing effluent to above about 12 to solubilize at least a portion of the copper catalyst. At least a portion of the recycled catalyst may be directed to a source of catalyst 40 in some embodiments.

Figure 3:
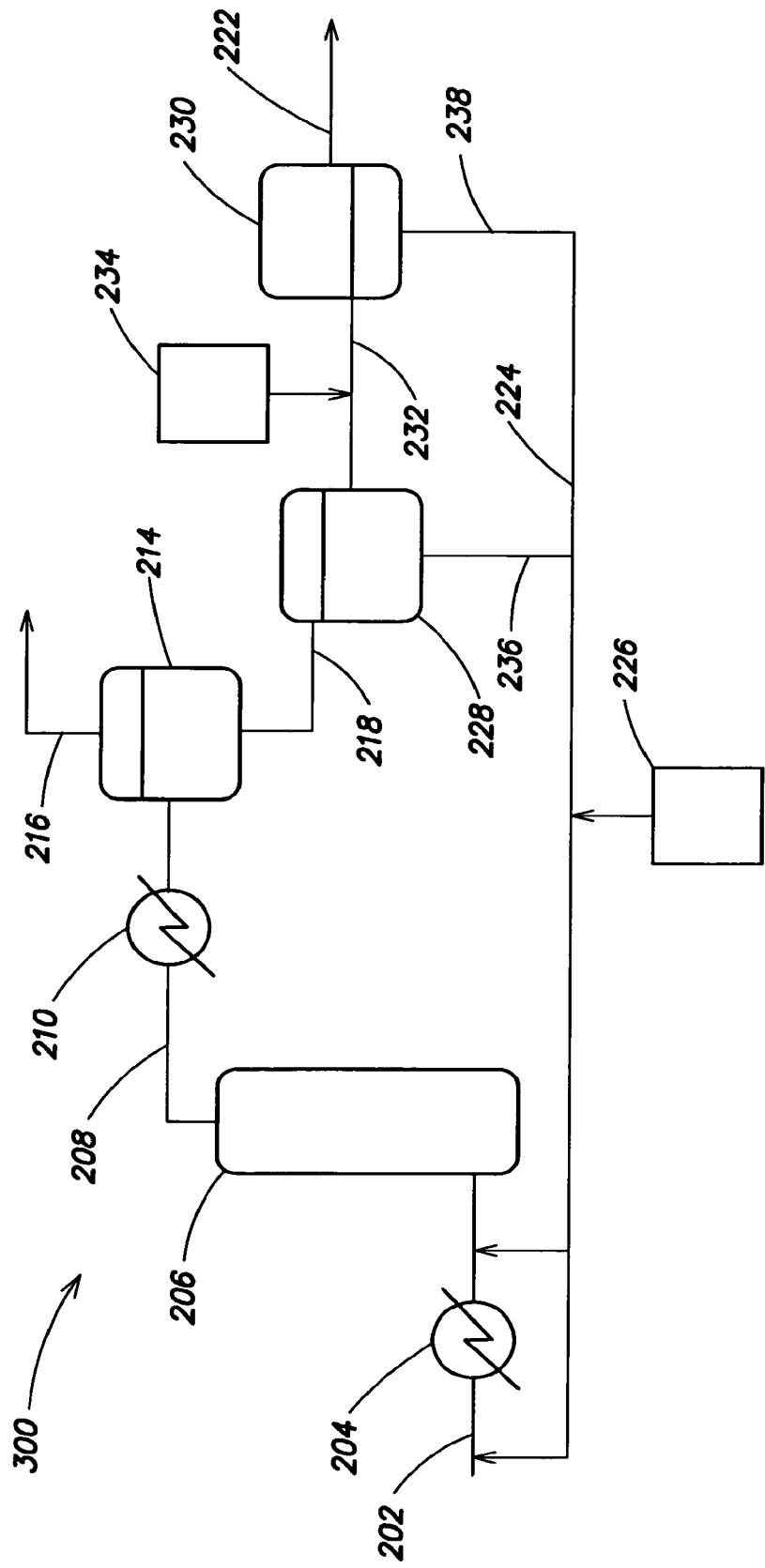
FIG. 3 is a system diagram in accordance with an embodiment of a wet oxidation system including a catalyst recycle process with a two step precipitation process.

It may be beneficial in some applications to use a two step catalyst settling process in order to make the system more efficient and reduce the amount of chemicals used during operation of the system. FIG. 3 illustrates an embodiment of a wet air oxidation system utilizing a two step catalyst settling process. As illustrated in FIG. 3, a system 300 with a two step catalyst settling process may utilize a set of clarifiers 228 and 230. In one embodiment, optional source of pH adjuster 212 may be positioned upstream of gas/liquid separator 214. In some embodiments of system 300, a source of pH adjuster and associated delivery pumps and/or valves and/or piping may be present and configured to deliver pH adjuster to locations upstream or downstream of gas/liquid separator 214 and/or into clarifier 228, clarifier 230, or both. Multiple pH sensors (not shown) may be located at locations upstream or downstream of any of the components of system 300 and coupled to a pH controller (not shown), such as controller 70 illustrated in FIG. 1, configured and arranged to control the flow of pH adjuster from one or more sources of pH adjuster located throughout the system, such as source of pH adjuster 234, through delivery pumps and/or valves and/or piping associated with the source or sources of pH adjuster.

In system 300 of FIG. 3 a rough clarification may take place in the first clarifier 228. At least a portion of a first separated solution from the first clarification step may be returned to the inlet of the system via lines 236 and 224 as dilution water and catalyst feed for further treatment. At least a portion of the supernatant from the first clarification step may travel through line 232 and be settled in a second clarifier step in clarifier 230 after being pH adjusted by the addition of acid or alkali compound from source of pH adjuster 234. Source of pH adjuster 234 and associated delivery pumps and/or valves and/or piping may be positioned and arranged to adjust the pH of the portion of the supernatant in line 232 or in clarifier 230, or both. In alternate embodiments of the systems according to FIG. 2 or FIG. 3, any or all of the clarifiers may be replaced with any form of separator capable of separating precipitated catalyst from the oxidized aqueous mixture. A solution containing concentrated solidified catalyst may be returned to the inlet of system 300 through lines 238 and 224 to be mixed with an incoming process stream, while oxidized effluent essentially free of catalyst may be withdrawn through line 222. At least a portion of the recycled catalyst may be directed to a source of catalyst 40 in some embodiments. A benefit of the two step system is that only a small portion of the effluent of the wet oxidation unit will need to be pH adjusted in order to precipitate catalyst. The portion of the effluent that may be recycled for dilution water may have soluble catalyst remaining in it, which is desirable. Source of pH adjuster 226 may be utilized to solubilize catalyst that may travel through line 224 by the addition of an acid or caustic compound in a similar manner as was discussed with regard to the example regarding copper catalyst above. The pH of the recycled effluent of the wet oxidation unit will also be very close to the necessary pH for keeping the catalyst soluble in the wet air oxidation system.

In the systems illustrated in FIG. 2 and FIG. 3, catalyst may be precipitated solely by adjusting the pH of the oxidized aqueous mixture. In some embodiments, catalyst may be precipitated solely by adjusting the pH of the oxidized aqueous mixture in a single direction. In some embodiments, catalyst may be precipitated solely by adjusting the pH of the oxidized aqueous mixture with a single pH adjustment agent. In some embodiments, catalyst may be precipitated solely by adjusting the pH of the oxidized aqueous mixture to a pH within a range of pH at which the catalyst is substantially insoluble or at least partially insoluble in the oxidized aqueous mixture. In some embodiments, pH adjustment may be accomplished without addition of any chemicals, such as by, for example, an electrodeionization process, in order to cause precipitation of the catalyst. In other embodiments, an additional chemical, such as, for example, a source of sulfide ions such as sodium sulfide or hydrogen sulfide may be added to the oxidized aqueous mixture in order to enhance the kinetics, or otherwise facilitate the precipitation of the catalyst. In some embodiments, catalyst may be solubilized in aqueous mixture to be oxidized at a pH within a first range and precipitated from oxidized aqueous mixture at a pH within a second range which does not overlap the first range.

According to one or more embodiments, the wet oxidized liquid effluent stream may be processed by a secondary treatment unit 80 as illustrated in FIG. 1, connected downstream of the oxidation reactor vessel 24 to remove remaining undesirable constituents present and/or polish when necessitated or desired. The secondary treatment unit 80 may be a chemical scrubber, a biological scrubber, an adsorption media bed, or other unit operation. In some embodiments, an advanced oxidation step including oxidation treatment of the wet oxidation effluent with ozone and ultraviolet light may be performed. Such advanced oxidation treatment is typically carried out in a vessel or tank at or near ambient temperature and pressure. The secondary treatment unit 80 may be sized to provide a surface area consistent with the desired degree of polishing. Alternatively, the liquid effluent may also be recycled back to reactor vessel 24 for further processing. Treatment of the off gas may also be required in a downstream off gas treatment unit depending on its composition and the requirements for discharge to the atmosphere.

Sensors to detect a concentration of a targeted odorous constituent may be provided upstream and/or downstream of the wet oxidation unit 24 to facilitate system control. For example, a sensor may be positioned at conduit 26 and be in communication with controller 70 to determine and/or control whether the liquid effluent stream should be diverted to the secondary treatment unit 80 to meet established environmental regulations.

It should be appreciated that numerous alterations, modifications and improvements may be made to the illustrated systems and methods. For example, one or more wet oxidation systems may be connected to multiple sources of process streams. In some embodiments, the wet oxidation system may include additional sensors for measuring other properties or operating conditions of the system. For example, the system may include sensors for temperature, pressure drop, and flow rate at different points to facilitate system monitoring. In accordance with one or more embodiments, the catalyst may be replenished during the wet oxidation process.

The disclosure contemplates the modification of existing facilities to retrofit one or more systems or components in order to implement the techniques of the disclosure. An existing wet oxidation system can be modified in accordance with one or more embodiments exemplarily discussed herein utilizing at least some of the preexisting equipment. For example, one or more pH sensors may be provided and a controller in accordance with one or more embodiments presented herein may be implemented in a preexisting wet oxidation system to promote catalyst solubility or to facilitate catalyst recycling.

The function and advantages of these and other embodiments of the present disclosure will be more fully understood from the following examples. These examples are intended to be illustrative in nature and are not considered to be limiting the scope of the disclosure. In the following examples, compounds are treated by wet oxidation to affect destruction of bonds therein.

EXAMPLES

Bench Scale Wet Oxidation (Autoclave) Reactors

In the following Examples, bench scale wet oxidation tests were performed in laboratory autoclaves. The autoclaves differ from the full scale system in that they are batch reactors, where the full scale unit may be a continuous flow reactor. The autoclaves typically operate at a higher pressure than the full scale unit, as a high charge of air must be added to the autoclave in order to provide sufficient oxygen for the duration of the reaction. The results of the autoclave tests provide an indication of the performance of the wet oxidation technology and are useful for screening operating conditions for the wet oxidation process.

The autoclaves used were fabricated from titanium, alloy 600 and Nickel 200. The selection of the autoclave material of construction was based on the composition of the wastewater feed material. The autoclaves selected for use, each have total capacities of 500 or 750 ml.

The autoclaves were charged with wastewater and sufficient compressed air to provide excess residual oxygen following the oxidation (ca. 5%). The charged autoclaves were placed in a heater/shaker mechanism, heated to the desired temperature (280° C. to 350° C.) and held at temperature for the desired time, ranging from about 60 minutes to about 360 minutes.

During the heating and reacting periods, the autoclave temperature and pressure were monitored by a computer controlled data acquisition system. Immediately following oxidation, the autoclaves were removed from the heater/shaker mechanism and cooled to room temperature using tap water. After cooling, the pressure and volume of the off gas in the autoclave head-space were measured. A sample of the off-gas was analyzed for permanent gases. Subsequent to the analysis of the off gas, the autoclave was depressurized and opened. The oxidized effluent was removed from the autoclave and placed into a storage container. A portion of the effluent was submitted for analysis and the remaining sample was used for post-oxidative treatment. In order to generate sufficient volume for analytical work and post-oxidation test work, multiple autoclave tests for each condition were run.

Example 1

Wet Oxidation Process Utilizing a Homogeneous Copper Catalyst

Bench scale wet oxidation tests were performed at 280° C. with a 60 minute time at temperature to determine the impact of a copper catalyst on the oxidation of acetic acid at various pH levels (pH=2.2, 8.1, 11.5, 12.5 and 13.5). The data is presented below in Table 1.

TABLE 1

Results from wet oxidation (WO) of an acetic acid solution using copper catalyst.

| | | | Wet oxidation at 280° C.-60 minutes | | | | | |
|---|---|---|---|---|---|---|---|---|
| | Reported As | | 10 g/L Acetic Acid | Effluent pH = 2.2 | Effluent pH = 8.1 | Effluent pH = 11.5 | Effluent pH = 12.5 | Effluent pH = 13.5 |
| Charge Conditions | | | | | | | | |
| Autoclave Material | — | — | — | Ti | Ti | Ni 200 | Ni 200 | Ni 200 |
| Autoclave Volume | ml | — | — | 500 | 500 | 500 | 500 | 750 |
| Volume of Liquid Charged | ml | — | — | 150 | 100 | 100 | 100 | 200 |
| Copper Concentration | g/L | Cu | — | 1 | 1 | 1 | 1 | 0.5 |
| NaOH Charged | g/L | NaOH | — | 0 | 7 | 1.2 | 1.6 | 20 |

TABLE 1-continued

Results from wet oxidation (WO) of an acetic acid solution using copper catalyst.

| | | | Wet oxidation at 280° C.-60 minutes | | | | |
|---|---|---|---|---|---|---|---|
| | Reported As | 10 g/L Acetic Acid | Effluent pH = 2.2 | Effluent pH = 8.1 | Effluent pH = 11.5 | Effluent pH = 12.5 | Effluent pH = 13.5 |
| Air Charged | psig | — | 310 | 200 | 200 | 200 | 260 |
| Oxidation Temperature | ° C. | — | 280 | 280 | 280 | 280 | 280 |
| Time at temperature | min | — | 60 | 60 | 60 | 60 | 60 |
| Analysis Results | | | | | | | |
| M. COD | mg/L | O2 | 10100 | 356 | 7300 | 7300 | 6960 | 1180 |
| % COD Destruction | — | — | — | 96.5 | 27.7 | 27.7 | 31.1 | 90 |
| TOC | mg/L | C | 3950 | 141 | 2790 | 2790 | 2750 | 485.0 |
| % TOC Destruction | — | — | — | 96.4 | 29.4 | 29.4 | 30.4 | 88.1 |
| Soluble Copper | mg/L | Cu | — | 633 | 1.04 | <0.1 | 0.18 | 84.5 |
| pH | — | — | — | 2.2 | 8.13 | 11.46 | 12.5 | 13.5 |
| Organic Acids | | | | | | | | |
| Acetic Acid | mg/L | CH3COOH | 100500 | 222 | 8390 | 7270 | 6480 | 1260 |
| % Acetic Acid Destruction | % | — | — | 97.8 | 16.5 | 27.7 | 35.5 | 87.5 |

The copper catalyst exhibited the highest solubility at pH levels of 2.2 and 13.5. When the pH of the oxidized effluent was 2.2 and 13.5, about 98% and 88% acetic acid destruction was achieved, respectively. This also corresponded to the highest percentages of COD destruction (96.5%, 90%) and TOC destruction (96.4%, 88.1%). In contrast, when the pH of the solution was maintained in the pH range where copper was not soluble (pH=8.1, 11.5 and 12.5) only about 17% to 37% acetic acid destruction was achieved. When the copper was not soluble, lower percentages of COD destruction and TOC destruction were observed as well. The data indicated that copper solubility substantially increased the oxidation of acetic acid.

Example 2

Wet Oxidation Process Utilizing a Homogeneous Vanadium Catalyst

Bench scale wet oxidation tests were performed on a water solution containing acetic acid using vanadium as a homogeneous catalyst at two different pH levels. The results are presented in Table 2 below.

TABLE 2

Results from wet oxidation of an acetic acid solution using a vanadium catalyst.

| | Reported As | 10 g/L Acetic Acid Feed for V runs | Without Catalyst WO at 280° C., 60 minutes, pH = 2.7 | With Catalyst WO at 280° C., 60 minutes, pH = 2.7 | Without Catalyst WO at 280° C., 60 minutes, pH = 6.5 | With Catalyst WO at 280° C., 60 minutes, pH = 5.3 |
|---|---|---|---|---|---|---|
| Lims Book Ref | | | 197268 2790-26-1 | 188294 2751-88-1 | 197271 2790-29-1 | 188420 2751-91-1 | 197272 2790-30-1 |
| Charge Conditions | | | | | | |
| Autoclave Material | — | — | — | Ti | Ti | Ti | Ti |
| Autoclave Volume | ml | — | — | 500 | 500 | 500 | 500 |
| Volume of Liquid Charged | ml | — | — | 150 | 150 | 150 | 150 |
| Vanadium Concentration | g/L | V | — | 0 | 5000 | 0 | 5000 |
| NaOH Charged | g/L | NaOH | — | 0 | 0 | 6.8 | 6.8 |

TABLE 2-continued

Results from wet oxidation of an acetic acid solution using a vanadium catalyst.

|  |  | Reported As | 10 g/L Acetic Acid Feed for V runs | Without Catalyst WO at 280° C., 60 minutes, pH = 2.7 | With Catalyst WO at 280° C., 60 minutes, pH = 2.7 | Without Catalyst WO at 280° C., 60 minutes, pH = 6.5 | With Catalyst WO at 280° C., 60 minutes, pH = 5.3 |
|---|---|---|---|---|---|---|---|
| Air Charged | psig | — | — | 300 | 300 | 300 | 300 |
| Oxidation Temperature | ° C. | — | — | 280 | 280 | 280 | 280 |
| Time at temperature | min | — | — | 60 | 60 | 60 | 60 |
| Analysis Results |  |  |  |  |  |  |  |
| TOC | mg/L | C | 3741 | 3710 | 3330 | 3790 | 3093 |
| % TOC Destruction | — | — | — | 2 | 11 | 5.3 | 17.3 |
| pH | — | — | — | 2.6 | 2.66 | 6.5 | 5.29 |

Under oxidative conditions, vanadium is soluble at pH levels greater than about 4.5. The results show that when the pH of the solution was 2.6, and the vanadium was mostly insoluble, only 2% destruction of TOC was achieved. A low percentage of TOC destruction was associated with a pH level of 2.66 as well. When the pH of the solution was increased to 5.3 (solubilizing the vanadium), while maintaining the same catalyst dosage, temperature, and time at temperature the destruction of TOC was increased to 17.3%. By increasing the pH of the solution from 2.66 to 5.3, there was about a 64% increase in the destruction of total organic carbon. The data indicated that vanadium solubility substantially increased the oxidation of acetic acid.

Example 3

Wet Oxidation Process Utilizing a Homogeneous Iron Catalyst

Bench scale wet oxidation tests were performed at 230° C. for 150 minutes on an oxalic acid solution at two different pH levels. The data is presented in Table 3 below.

TABLE 3

Results from wet oxidation of an oxalic acid solution using an iron catalyst.

|  | Units | Reported As | Feed 18 g/L Oxalate | High pH, no catalyst | High pH, Fe catalyst | Low pH, no catalyst | Low pH, Fe catalyst |
|---|---|---|---|---|---|---|---|
| Charge Conditions |  |  |  |  |  |  |  |
| Autoclave Material | — | — | — | Inc 600 | Inc 600 | Ti | Ti |
| Autoclave Volume | ml | — | — | 750 | 750 | 500 | 500 |
| Volume of Liquid Charged | ml | — | — | 250 | 250 | 200 | 200 |
| Air Charged | psig | — | — | 520 | 520 | 440 | 440 |
| Oxidation Temperature | ° C. | — | — | 230 | 230 | 230 | 230 |
| Time at temperature | min | — | — | 60 | 60 | 60 | 60 |
| Fe+2 added (as FeSO4) | g/L | Fe | — | — | 2.24 | — | 2.24 |
| Analysis Results |  |  |  |  |  |  |  |
| TOC | mg/L | C | 5100 | 3650 | 3720 | 240 | <5.6 |
| % TOC Destruction | — | — | — | 28.4 | 27.1 | 95.3 | 99.9 |
| DIC | mg/L | C | <20 | 955 | 912.0 | — | — |
| pH | — | — | 13.7 | 13.7 | 13.6 | 2.6 | 1.7 |

Under oxidative conditions, iron is soluble below a pH level of about 4. The results indicated that there was no enhancement of oxidation when an iron catalyst was used at a high pH level (pH=13.6 and 13.7) where it was insoluble. When the pH of the solution was in the range where the iron was soluble (pH=2.6 and 1.7), the destruction of oxalic acid was increased to about 95% and about 100%, respectively. The data indicated that iron solubility substantially increased the oxidation of oxalic acid.

Example 4

Wet Oxidation of Chlorophenol Utilizing a Homogeneous Iron Catalyst

Both iron catalyzed and non-catalyzed oxidations of chlorophenol were performed at 150° C. with a 90 minute time at temperature. The data is tabulated below in Table 4.

TABLE 4

Results from wet oxidation of chlorophenol using an iron catalyst.

|  |  |  | WO of Chlorophenol (1.24 g/L) | | |
|---|---|---|---|---|---|
|  | Units | Reported As | Feed | No Catalyst | Fe Catalyst |
| LIMS Book Ref |  |  | 182594 2751-51-1 | 182595 2751-82-1 | 182596 2751-83-1 |
| Charge Conditions |  |  |  |  |  |
| Autoclave Material | — | — | — | Ti | Ti |
| Autoclave Volume | ml | — | — | 500 | 500 |
| Volume of Liquid Charged | ml | — | — | 200 | 200 |
| Air Charged | psig | — | — | 200 | 200 |
| Oxidation Temperature | ° C. | — | — | 150 | 150 |

TABLE 4-continued

Results from wet oxidation of chlorophenol using an iron catalyst.

| | | | WO of Chlorophenol (1.24 g/L) | | |
|---|---|---|---|---|---|
| | Units | Reported As | Feed | No Catalyst | Fe Catalyst |
| Time at temperature | min | — | — | 90 | 90 |
| Fe Catalyst Added | g/L | FeSO$_4$7H$_2$O | — | — | 0.5 |
| Analysis Results | | | | | |
| M. COD | mg/L | O2 | 2040 | 1890 | 650 |
| COD Destruction | % | — | — | 7.4 | 68.1 |
| TOC | mg/L | C | 667 | 620 | 284 |
| TOC Destruction | — | — | — | 7.0 | 57 |
| Sol Fe | mg/L | Fe | — | — | 48 |
| pH | — | — | 5.4 | 2.90 | 2.30 |

These tests showed that increasing the solubility of the iron catalyst, by lowering the pH level from 2.9 to 2.3, resulted in increasing TOC destruction from about 7% to about 57%. Likewise, lowering the pH level increased COD destruction from about 7.4% to about 68.1%. The data indicated that even slight adjustment of pH level significantly increases the efficiency of a catalytic wet oxidation process.

Example 5

Copper Oxide Recycle Testing

Comparison tests to evaluate pH adjustment to recover copper catalyst were conducted. Two sets of tests were performed. In a first set of tests, non-pH adjusted naphthenic spent caustic was oxidized at 200° C. with a 120 minute residence time and 5000 mg/L of copper added as copper oxide. The second set of tests were performed with pH adjusted naphthenic spent caustic at 200° C. with 120 minutes residence time and 500 mg/L of copper added as copper oxide.

Each set of tests were run under the same conditions as follows. A sample of naphthenic spent caustic was oxidized to produce an oxidized effluent. The oxidized effluent was pH adjusted to about 8.5 using sodium hydroxide and centrifuged. A portion the supernatant was removed and the remaining effluent containing the copper oxide was recycled back as dilution water and combined with fresh feed for a subsequent oxidation. Each run underwent several repetitions, in that the oxidation of the initial feed resulted in a first recycled effluent containing copper oxide, which was combined with fresh feed and oxidized, resulting in a second recycled effluent containing copper oxide. Each recycle was combined with fresh feed for oxidation and formation of a subsequent recycle for the number of cycles indicated in Tables 5 and 6.

The COD and TOC destructions for each recycle repetition were calculated in two different methods. The first method was based upon the feed mixture that was placed in an autoclave. Since the oxidized effluent from the previous run was used to dilute the as received spent caustic, the feed COD was calculated using the ratio of fresh feed to oxidized effluent. The second method was based upon the as received feed and is listed as "COD destruction—overall." Since the oxidized effluent was returned to the WAO system for dilution, no additional water was added to the system that would lower the overall COD.

Results for Non-pH adjusted and pH adjusted recycle are reported in Tables 5 and 6, respectively.

TABLE 5

Non-pH adjusted effluent recycle testing on naphthenic spent caustic

| | | | | | | Recycle-pH = 6 | | |
|---|---|---|---|---|---|---|---|---|
| Received Sample Label | Units | Reported As | KSW | Diluted Feed | Initial | Recycle 1 | Recycle 2 | Recycle 3 |
| Charge Conditions | | | | | | | | |
| Temperature | °C. | | | | 200 | 200 | 200 | 200 |
| Residence Time | Hrs | | | | 2 | 2 | 2 | 2 |
| Cu Added as CuO | g/L | | | | 5 | 5 | 5 | 5 |
| Sulfuric Acid Added | % v/v | | | | 0 | 0 | 0 | 0 |
| Analysis Results | | | | | | | | |
| COD | mg/L | O2 | 259,000 | 39627 | — | 22700 | 27500 | 30900 |
| COD Destruction-Autoclave | % | — | — | — | — | 42.7 | 54.2 | 51.8 |
| COD Destruction-Overall | % | — | — | — | — | — | — | 88.1 |
| TOC | mg/L | | 57,900 | 8859 | — | 8080 | 10100 | 10900 |
| TOC Destruction-Autoclave | % | — | — | — | — | 8.8 | 36.7 | 38.3 |
| TOC Destruction-Overall | % | — | — | — | — | — | — | 81.2 |
| Soluble Copper | mg/L | Cu | — | — | — | 22.9 | 34.3 | 55.5 |

TABLE 5-continued

Non-pH adjusted effluent recycle testing on naphthenic spent caustic

| | | | | | | Recycle-pH = 6 | | |
|---|---|---|---|---|---|---|---|---|
| Received Sample Label | Units | Reported As | KSW | Diluted Feed | Initial | Recycle 1 | Recycle 2 | Recycle 3 |
| Total Copper | mg/L | Cu | — | — | — | 26.3 | 36.4 | 3500 |
| pH | — | — | 13.5 | — | 5.7 | 6.3 | 6.1 | 6.2 |

As shown in Table 5, adjusting the pH of the oxidized effluent to about 8.5 followed by settling with a centrifuge recovered 22.9 mg/L soluble copper in Recycle 1, which was then combined with fresh feed for further oxidation. The pH of the recycled effluent containing soluble copper was not further adjusted with acid or base prior to being combined with the fresh feed.

The amount of soluble copper recovered in each recycle increased in each iteration to 55.5 mg/L in Recycle 3. After three recycle iterations, the oxidation/recycle system started to reach a steady state condition with an autoclave COD destruction efficiency of 51.8% which resulted in an overall COD destruction efficiency of 88.1%. Autoclave TOC destruction efficiency increased with each iteration from 8.8% to 38.3% with an overall TOC destruction efficiency of 81.2% with Recycle 3. These results show that pH adjustment of an oxidized effluent containing copper catalyst may produce a recycled effluent containing soluble copper that may be directed back to the oxidation system which may reduce the amount of fresh catalyst to be added to the oxidation system.

TABLE 6 pH adjusted effluent recycle testing on naphthenic spent caustic

| | | | | | | Recycle-pH <5 | | | | |
|---|---|---|---|---|---|---|---|---|---|---|
| Received Sample Label | Units | Reported As | KSW | Diluted Feed | Initial | Recycle 1 | Recycle 2 | Recycle 3 | Recycle 4 | Recycle 5 |
| Charge Conditions | | | | | | | | | | |
| Temperature | °C. | | | | 200 | 200 | 200 | 200 | 200 | 200 |
| Residence Time | Hrs | | | | 2 | 2 | 2 | 2 | 2 | 2 |
| Cu Added as CuO | g/L | | | | 0.5 | 0.5 | 0.5 | 0.5 | 0.5 | 0.5 |
| Sulfuric Acid Added | % v/v | | | | 0.25 | 0.25 | A | B | C | C |
| Analysis Results | | | | | | | | | | |
| COD | mg/L | O2 | 259,000 | 39627 | 7110 | 11200 | 15400 | 14900 | 15300 | 15100 |
| COD Destruction Autoclave | % | | — | — | — | 82.1 | 76.1 | 69.4 | 72.4 | 71.4 | 71.9 |
| COD Destruction Overall | % | | — | — | — | — | — | 94.1 | 94.2 | 94.1 | 94.2 |
| TOC | mg/L | | 57,900 | 8859 | 2630 | 4130 | 5740 | 5670 | 6020 | 5850 |
| TOC Destruction | % | | — | — | — | 70.3 | 63.7 | 54.5 | 59.4 | 56.8 | 58.9 |
| TOC Destruction Overall | % | | — | — | — | — | — | 90.1 | 90.2 | 89.6 | 89.9 |
| Soluble Copper | mg/L | Cu | — | — | 12.1 | 152 | 108 | 354 | 14.7 | 289 |
| Total Copper | mg/L | Cu | — | — | 13.7 | 176 | 991 | 428 | 19.4 | 359 |
| pH | — | — | 13.5 | — | 4.7 | 5.3 | 5.7 | 5.1 | 4.4 | 4.1 |

A Recycled effluent was pH adjusted to 3.5 with acid
B Recycled effluent was pH adjusted to 2.8 with acid
C Recycled effluent was pH adjusted to 2.5 with acid As shown in Table 6, adjusting the pH of the oxidized effluent to about 8.5 followed by settling with a centrifuge recovered 152 mg/L soluble copper in Recycle 1, which was then combined with the fresh feed for further oxidation. Prior to coming with the fresh feed, the each Recycle 1-5 was ph adjusted with acid as indicated.

The amount of soluble copper recovered in each recycle increased from 152 mg/L to 354 mg/L from Recycle 1 to Recycle 3. Recycle 4, which was a result of a pH adjustment of the oxidized effluent to 8 instead of about 8.5 followed by precipitation at 60° C. showed significantly less soluble copper at 14.7 mg/L, however, subsequent Recycle 5 which resulted from a pH adjustment of the oxidized effluent to about 8.5 again showed a marked increase in soluble copper to 289 mg/L.

As shown in Table 6, the addition of acid to the feed and the subsequent addition of acid to each Recycle 1-5 caused the system to reach a steady state sooner than if no pH adjustment was made to the recycle. The recycle testing performed with pH adjusted feed indicated that a steady state condition was reached after two recycle repetitions. The overall TOC destruction efficiency stabilized at between 90.2% and 89.6% after two cycles. Likewise, the overall COD destruction efficiency stabilized at about 94% after two cycles Similarly, the addition of acid to the feed and the subsequent addition of acid to each Recycle 1-5 in higher TOC and COD destruction efficiencies than if no pH adjustment was made to the recycle. As shown in Table 6, the addition of acid to each Recycle increased the overall TOC destruction efficiency to approximately 90% as compared to the destruction efficiency of approximately 81% without the addition of acid to each Recycle. Similarly, the addition of acid to each Recycle increased the overall COD destruction efficiency to approximately 88% compared to approximately 72% with the addition of acid to each Recycle. The addition of sulfuric acid to the recycle brought the pH of the recycle to a range in which the copper catalyst was more soluble and this increased level of soluble copper was available in subsequent oxidation cycles to increase destruction efficiencies.

For both test runs with and without pH adjustment of the recycle, another advantage to recycling the oxidized effluent and catalyst back into the WAO unit was that it increased the residence time for the more difficult to oxidize components. The residence time was extended proportionately to the amount of dilution water that was be added, i.e. the more dilution water required the longer the residence time. The results from the recycle tests indicated that this increased residence time was effective at destroying a portion of the components that was initially resistant to oxidation. Since it was necessary to use a large amount of dilution in the autoclave to reduce the COD of the as received caustic from 260,000 mg/L to approximately 40,000 mg/L the residence time for the hard to oxidize components was also very high.

Example 6

Wet Oxidation Process Utilizing a Homogeneous Copper Catalyst

Bench scale wet oxidation tests were performed at 280° C. with a 60 minute time at temperature to determine the impact of a copper catalyst on the oxidation of acetic acid at various pH levels (pH=2.2, 2.9, 4.3, 4.7, 8.1, and 11.5). The data is presented below in Table 7.

TABLE 7

| Charge Conditions | Acetic Acid (10 g/L) Feed | Wet oxidation at 280° C.-60 minutes | | | | | |
|---|---|---|---|---|---|---|---|
| | | Effluent pH = 2.2 | Effluent pH = 2.9 | Effluent pH = 4.3 | Effluent pH = 4.7 | Effluent pH = 8.1 | Effluent pH = 11.5 |
| Autoclave Material | | Ti | Ti | Ti | Ti | Ti | Ni |
| Autoclave Volume (ml) | | 500 | 500 | 500 | 500 | 500 | 500 |
| Volume of Liquid (ml) | | 100 | 100 | 100 | 100 | 100 | 100 |
| Total Copper Charged (mg/L) | | 1000 | 1000 | 1000 | 1000 | 1000 | 1000 |
| Sodium Hydroxide Charged (mg/L) | | 0 | 1 | 3 | 4 | 7 | 12 |
| Air Charged (psi) | | 200 | 200 | 200 | 200 | 200 | 200 |
| Oxidation Temperature (° C.) | | 280 | 280 | 280 | 280 | 280 | 280 |
| Time At Temp (min) | | 60 | 60 | 60 | 60 | 60 | 60 |
| Analysis Results | | | | | | | |
| M. COD (mg/L) | 10100 | 360 | 5830 | 6360 | 7710 | 7300 | 7300 |
| % COD Destruction | | 96.4 | 42.3 | 37.0 | 23.7 | 27.7 | 27.7 |
| Soluble Copper (mg/L) | | 630 | 100 | 26 | 14 | 1 | <0.1 |
| % Copper Dissolved | | 63.0 | 10.0 | 2.6 | 1.4 | 0.1 | 0 |

The results indicated that in general, at low pH values (acidic PH values), the solubility of the copper catalyst decreased with increasing pH. Further, the degree of acetic acid destruction also decreased with increasing pH. This data further confirms the conclusions drawn from Example 1; mainly that copper solubility substantially increased the oxidation of acetic acid. As shown by this example, the oxidation process is enhanced by the presence of the copper catalyst under a wide range of pH values. Copper catalyst may enhance the oxidation of undesirable constituents in an aqueous mixture in a wet air oxidation process at low pH values ranging from about 2 to about 4 or about 4.5.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the systems and techniques of the invention are used. Those skilled in the art should also recognize, or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

What is claimed is:

1. A catalytic wet oxidation system comprising:
   a wet oxidation unit;
   a source of an aqueous mixture comprising at least one undesirable constituent fluidly connected to the wet oxidation unit;
   a source of copper catalyst soluble in the aqueous mixture fluidly connected to the aqueous mixture, the aqueous mixture desired to have a solubility pH at which the catalyst is substantially soluble, the solubility pH being below about 4 or above about 12;
   a first pH sensor configured to detect a pH level of the aqueous mixture;
   a pH controller in communication with the first pH sensor configured to generate a first control signal to adjust the pH level of the aqueous mixture to the solubility pH of below about 4 or above about 12 for treatment of the at least one undesirable constituent in the wet oxidation reactor in response to the first pH sensor registering a pH level above about 4 or below about 12; and
   a second sensor in communication with the controller, the second sensor configured to detect a pH level of an oxidized aqueous mixture formed in the wet oxidation unit, the pH controller configured to generate a second control signal to adjust the pH level of the oxidized aqueous mixture to a second range at which the catalyst is substantially insoluble downstream of the wet oxidation unit.

2. The system of claim 1, further comprising:
   a separator in direct fluid communication downstream of the wet oxidation unit and downstream of the pH controller and configured to precipitate, solely by the adjustment of the pH level of the oxidized aqueous mixture at least a portion of the catalyst,
   the pH controller further configured to generate the second control signal to adjust a pH level of the oxidized aqueous mixture in the separator to within a range from about 6 to about 12;
   a recirculation line fluidly connected to an outlet of the separator and to an inlet of the at least one of the source of catalyst and an inlet to the wet oxidation system; and
   a source of alkali compound positioned downstream of and fluidly connected to at least one of the separator and the wet oxidation unit and configured to deliver alkali compound to at least one of the separator and the wet oxidation unit.

3. The system of claim 2, further comprising a source of an acid positioned downstream of and fluidly connected to at least one of the separator and the wet oxidation unit.

4. The system of claim 1, wherein the solubility pH is below about 2 and above about 13.

5. The system of claim 2, further comprising a clarifier upstream of and fluidly connected to the separator configured to clarify the oxidized aqueous mixture, thereby forming a reject.

6. The system of claim 5, further comprising a conduit configured to transport at least a portion of the reject to a location in the system upstream of and in fluid communication with the wet oxidation unit and to contact the reject with the aqueous mixture comprising at least one undesirable constituent.

7. The system of claim 2, wherein substantially all of the catalyst is recovered.

8. The system of claim 2, further including a source of a pH adjuster fluidly connected with the recirculation line.

9. The system of claim 8, further comprising a third pH sensor in communication with the pH controller, configured to detect a pH level of an aqueous mixture in the recirculation line, the pH controller further configured to generate a control signal to adjust a pH level of the aqueous mixture in the recirculation line in response to the third pH sensor registering a pH level outside a predetermined pH solubility range for the catalyst.

* * * * *